United States Patent Office 2,805,265
Patented Sept. 3, 1957

2,805,265

ARALKYL HALIDE STABILIZERS

Charles A. Heiberger, Nitro, W. Va., assignor to Food Machinery and Chemical Corporation, New York, N. Y., a corporation of Delaware No Drawing. Application December 31, 1953,
Serial No. 401,715

16 Claims. (Cl. 260—651)

This invention relates to the stabilization of aralkyl halides of the general formula $ArCH_2Hl$, where Ar represents any substituted or unsubstituted aromatic radical, and Hl represents halogen.

More particularly, this invention relates to the stabilization of aralkyl chlorides, especially where Ar is a substituted or unsubstituted phenyl or naphthyl radical.

These aralkyl halides are characterized to a varying degree with the property of instability during preparation, purification and storage, due to the deleterious effects of heavy metal contamination, heat and radiation. Heavy metal contamination appears to be the principal cause of instability, and may be due to the presence of the heavy metals themselves, such as iron, nickel, copper, lead, and zinc, or to the presence of salts of such metals, or other compounds thereof.

The degree of instability of aralkyl halides varies considerably, depending upon such factors as their particular chemical identity, degree of initial purity, the nature of the container, and the conditions which have obtained during the processing, purification and storage. This lack of stability is a very serious problem, and has been the object of considerable research directed toward obtaining a suitable remedy, since large losses of the compounds are caused, and frequently damage to the containers and place of storage results. Among these compounds, the chlorides in particular tend to decompose under normally encountered storage conditions, and are not considered safe for transporting as industrial chemicals in iron drums.

The instability problem of this class of compounds is not to be confused with the instability problem encountered in the alkyl halide class, well-exemplified by carbon tetrachloride, where the instability is largely a function of contamination by moisture. To correct that type of instability, dehydrating agents have been utilized, especially anhydrous salts which are capable of taking up water to form stable hydrates, in much the same way that anhydrous calcium sulfate or plaster of Paris take up water to form the stable hydrate gypsum. In contrast, in the present instability problem the presence or absence of water is immaterial. In fact, one of the prior art methods of stabilizing benzyl chloride, an important member of the present class, is the addition of an aqueous sodium carbonate solution to the container of benzyl chloride.

The inherent instability of this class of compounds normally leads to the decomposition of the aralkyl halide, with the formation of halogen acid, and a polymerization of the remainder of the molecule. During preparation and purification of these compounds this decomposition causes serious losses in yield. During storage in metal containers, the hydrogen halide liberated attacks the container metal and this autocatalyzes the decomposition at an increasing rate.

It is accordingly a principal object of this invention to provide novel stabilizers for aralkyl halides.

Another important object of this invention is to provide novel stabilized compositions comprising an aralkyl halide and a suitable stabilizer.

Another object of the invention is to provide a method for stabilizing aralkyl halides during preparation, purification, storage and use.

Other objects of the invention will be apparent to those skilled in the art from a consideration of the disclosure herein.

It has been discovered that aralkyl halides may be stabilized by the addition of a chemical which is capable of liberating a dioxide of the sulfur family by reaction with an acid, i. e. the hydrogen halide which would be formed by the decomposition of the aralkyl halide to be stabilized. The sulfur family comprises, of course, the non-metals sulfur, selenium and tellurium, the latter two non-metals being what are considered relatively rare elements, but nevertheless very closely chemically related to sulfur in many chemical reactions. The preferred and by far the most effective class of compounds, perhaps by reason of the more non-metallic nature of sulfur as compared with selenium and especially tellurium, is the sulfur-containing type, such as the various types of sulfite salts which are capable of liberating sulfur dioxide by reaction with an acid. This well-known type of reaction is given by such sulfite salts as the normal and acid sulfites, hyposulfites, pyrosulfites or metabisulfites, some of the thionates and by thiosulfates.

The acid sulfites, such as $NaHSO_3$, are somewhat preferred over the normal sulfites, such as $Na_2SO_3$, because they liberate sulfur dioxide more quickly, the normal sulfite requiring twice as much acid for this reaction. Largely due to their lower cost and ready availability, as well as their high efficiency, sodium pyrosulfite, sodium bisulfite and sodium thiosulfate are preferred species of this large class of compounds.

These salts may be any of the conventional alkali or alkaline earth salts, and ammonium salts, but no sulfur dioxide liberating salt should be used which contains a metal ion capable of catalyzing the decomposition of the aralkyl halides, such as the heavy metals referred to above.

The salt may be added in the form of a hydrate, an anhydrous compound, or as an aqueous solution, for as indicated above the presence or absence of water is largely immaterial, since it appears to have no deleterious effect upon the stability of this class of compounds. Thus, sulfite waste liquor is a satisfactory and very economical stabilizer. In some cases, however, it may be desirable to use the anhydrous or hydrate compound, so as to avoid the necessity for removing any appreciable amount of water from the product at the time of its subsequent use.

The stabilizing effect of this class of stabilizers is not to be confused with a neutralizing action. They are much more effective than such compounds as sodium carbonate and sodium silicate, which are, of course, considerably more effective as neutralizers. The desirable effect may be due to a complexing action of the sulfur dioxide which inhibits further decomposition, although it is not intended that this discovery be limited by any theory of the mechanism involved. It may well be that the unique stabilizing effect is a result of several coacting factors. Sulfur dioxide gas alone was not an effective stabilizer at high temperatures, but the problem of stabilization is much more severe under these conditions.

The amount of stabilizer required depends upon a number of various factors, as indicated above, but effective stabilization is observed under some conditions when as little as 0.1% of stabilizer is added. Under more adverse conditions, such as higher temperatures and/or excessive contamination, it may be necessary to add several percent of the stabilizer. Larger quantities are seldom necessary or desirable, and in most cases less than 5% of the stabilizer protects the aralkyl halide against decomposition under the most severe conditions normally encountered.

The invention will be better understood by a consideration of some examples typical of its application. Some of the tests were conducted under storage conditions which would normally be met in transit and warehouses. Other tests were devised to evaluate the stabilizers under accelerated storage conditions and under conditions encountered during preparation, purification and use of the aralkyl halides. In these accelerated tests, it was desirable to conduct the tests in glass equipment and add heavy metal contamination in the form of a heavy metal, a heavy metal salt or a water solution of the salt.

The examination of the test products included determinations of acidity, visual examination as to such factors as viscosity and color, and vacuum distillation to determine the percent of aralkyl halide recoverable. Treatment conditions were varied if excessive gas evolution, foaming or thickening occurred. In some cases, distillation was stopped if hydrogen halide evolution became pronounced.

Example 1

In a room temperature storage test, a sample of dimethyl benzyl chloride, to which had been added 0.02% by weight of ferric chloride as a contaminant, underwent substantial decomposition in one week, as indicated by the development of hydrogen chloride acidity from an initial value of 0.0036% to a final value of 0.336%, or an increase of about 100 times the original value. In contrast with this control run, a similar sample to which had been added 1% by weight of sodium metabisulfite, showed only a very slight gain in acidity to a final value of 0.011% during the same storage period.

Example 2

Under normal storage conditions, commercial aralkyl chlorides stored in iron drums are regularly found to have developed high acidity, as much as 50% of the product polymerized, and frequently the iron container ruptured and much of the product was lost. However, a sample of dimethyl benzyl chloride, to which had been added 1% sodium metabisulfite, stored in a five gallon iron drum for four months at room temperature showed practically no change in properties, the acidity increasing only very slightly from an initial value of 0.009% to a final value of 0.055%. Under the same conditions, a sample of ethyl benzyl chloride stabilized in the same way showed no measurable changes in any property after a thirteen month storage period.

Example 3

A commercial sample of dimethyl benzyl chloride was tested for stability by storage in the dark in glass containers at room temperature. The tests included a control sample, one to which 5% by weight of sodium pyrosulfite had been added, one to which 0.1% by weight of ferric chloride had been added in the form of 20% aqueous solution, and finally a sample to which both the ferric chloride and pyrosulfite had been added. Determinations of acidity were made at intervals on all of the samples, the results being shown in the table below.

| Sample | Initial | 1 Day | 3 Days | 7 Days |
| --- | --- | --- | --- | --- |
| Control | 0.1 | 0.2 | 0.1 | 0.2 |
| Containing Pyrosulfite | 0.2 | 0.2 | | 0.1 |
| Containing FeCl$_3$ | 0.1 | 0.5 | 0.7 | 9.2 |
| Containing FeCl$_3$ and Pyrosulfite | 0.1 | 0.1 | 0.3 | 0.3 |

The sample contaminated with iron chloride underwent nearly a 100-fold increase in acidity, indicating substantial decomposition. The same material to which pyrosulfite had been added underwent practically no change in acidity.

Example 4

Experimental results indicative of the small amount of stabilizer needed were obtained in a series wherein dimethyl benzyl chloride was heated for five hours at about 130–135° C., in the presence of nickel metal in some of the tests. Without any nickel metal or stabilizer present, about 10% of high boiling residue or polymer was formed. When nickel metal was present, the viscosity change was so great that it was impossible to make any recovery determination at all, due to the presence of a large amount of polymer. Repeating the test in the presence of nickel metal, the addition of 0.1% by weight of sodium metabisulfite reduced the formation of polymer to only 2%. When the amount of stabilizer was increased to 5%, no polymer was formed at all. Higher amounts proved to be unnecessary, and longer periods of heating caused no failure of the stabilizing action. In contrast, the use of 10% of prior art stabilizer sodium carbonate gave a residue of 15% polymer, sodium bicarbonate gave 16%, and 5% of potassium carbonate gave 21% polymer.

Example 5

A commercial sample of methyl benzyl chloride was examined for stability in the presence of various stabilizers, including sodium carbonate, a prior art stabilizer. A unit weight of the compound was heated for one hour at 175° C. in a glass vessel, 0.2% by weight of nickel chloride being added in each case as a source of heavy metal contamination. In a sample containing 1% by weight (0.74 mole percent) of sodium pyrosulfite, only 0.015% acidity developed and the methyl benzyl chloride was recovered by vacuum distillation in 100% yield. An identical result was obtained using 0.74 mole percent of sodium thiosulfate as the stabilizer. When potassium pyrosulfite was used as the stabilizer, the acidity developed was only 0.010%, and a 100% yield was again obtained. In decided contrast, the use of sodium carbonate as a stabilizer resulted in practically complete polymerization in one half hour under the same conditions of evaluation. This example is a typical illustration of the great superiority of these sulfur dioxide liberating stabilizers in comparison with the best known prior art stabilizer.

Example 6

In a series of accelerated tests, methyl benzyl chloride samples were heated at 150° C. for one hour in the presence of 0.02% by weight of nickel chloride and, in some experiments, 0.74 mole percent of stabilizer. The results are presented in tabular form below.

| Stabilizer | Final Acidity (Percent as HCl) | Percent Recovery of Aralkyl Chloride |
| --- | --- | --- |
| None | 0.160 | 80 |
| None | 0.125 | 72 |
| None | 0.085 | 81 |
| None | 0.045 | 78 |
| Na$_2$S$_2$O$_5$ | 0.015 | 100 |
| K$_2$S$_2$O$_5$ | 0.015 | 100 |
| Na$_2$SO$_3$·7H$_2$O | 0.045 | 97 |
| NaHSO$_3$ | 0.015 | 100 |
| NaHSO$_3$ | 0.045 | 98 |
| Na$_2$S$_2$O$_4$·2H$_2$O | 0.030 | 99 |
| Na$_2$S$_2$O$_3$·5H$_2$O | 0.015 | 100 |
| (NH$_4$)$_2$SO$_3$·H$_2$O | 0.045 | 100 |
| (NH$_4$)$_2$S$_2$O$_5$ | 0.015 | 99 |
| (NH$_4$)HSO$_3$ | 0.025 | 100 |
| Waste sulfite liquor (aq.) | 0.015 | 99 |
| Na$_2$SeO$_3$ | 0.100 | 98 |
| MgSO$_3$·6H$_2$O | 0.015 | 99 |
| CaSO$_3$·2H$_2$O | 0.015 | 98 |
| BaSO$_3$ | 0.010 | 99 |
| Li$_2$SO$_3$·H$_2$O | 0.030 | 99 |

Example 7

When dimethyl benzyl chloride was heated at 135–150°

C. for periods ranging from two to five hours, in the presence of nickel metal, the recovery of the compound ranged from about 20–75%, depending upon the particular sample used and the time of heating. In contrast, when the experiments were repeated in the presence of stabilizers of the type of the instant invention, the results obtained were greatly improved. Thus, 1.0% by weight of lithium sulfite monohydrate ($Li_2SO_3 \cdot H_2O$) allowed a recovery of 95.7%, even though the compound had been heated at 150° C. for five hours in the presence of nickel metal. Similarly, 1.0% sodium metabisulfite ($Na_2S_2O_5$) gave a recovery of 97.3%.

This invention is applicable to unstable aralkyl halides in general, but the invention is of greatest importance in the stabilization of the aralkyl chloride compounds most commonly used in commerce, such as benzyl chloride, methyl benzyl chloride, dimethyl benzyl chloride, ethyl benzyl chloride, diethyl benzyl chloride and various naphthobenzyl chlorides.

As indicated above, the sulfur dioxide liberating compounds are the preferred class, although it will be noted that in Example 6 sodium selenate was quite effective as a stabilizer. In view of some inconclusive results obtained with similar tellurium compounds, perhaps due to the less non-metallic nature of tellurium, and further due to the high cost of such compounds, they are not recommended for use in this invention.

From a consideration of the foregoing discovery and applications thereof, it will be obvious to those skilled in the art that this invention may be utilized by means of minor variations, all of which are intended to fall within the spirit and scope of the appended claims.

This application is a continuation-in-part of my co-pending application, filed May 9, 1951, Serial No. 225,461, and now abandoned.

That which is claimed as new is:

1. A stabilized aralkyl halide composition, comprising: an aralkyl halide and an effective stabilizing proportion of an inorganic salt selected from the group consisting of ammonium, alkali and alkaline earth salts of sulfurous, pyrosulfurous, hyposulfurous and thiosulfuric acids.

2. The composition of claim 1, wherein the halogen of the aralkyl halide is chlorine.

3. The composition of claim 2, wherein the aralkyl chloride has the generic formula $ArCH_2Cl$, the Ar being selected from the group consisting of substituted and unsubstituted phenyl and naphthyl radicals.

4. The composition of claim 1, wherein the aralkyl halide is benzyl chloride.

5. The composition of claim 1, wherein the aralkyl halide is methyl benzyl chloride.

6. The composition of claim 1, wherein the aralkyl halide is dimethyl benzyl chloride.

7. The composition of claim 1, wherein the aralkyl halide is ethyl benzyl chloride.

8. The composition of claim 1, wherein the aralkyl halide is naphthobenzyl chloride.

9. The method of stabilizing aralkyl halides against the deleterious effects of heavy metal contamination, heat and radiation, comprising: adding to said aralkyl halide an effective stabilizing proportion of an inorganic salt selected from the group consisting of ammonium, alkali and alkaline earth salts of sulfurous, pyrosulfurous, hyposulfurous and thiosulfuric acids.

10. The process of claim 9, wherein the salt is an alkaline metal salt.

11. The process of claim 9, wherein the salt is an alkaline earth salt.

12. The process of claim 9, wherein the salt is an ammonium salt.

13. The process of claim 9, wherein the salt is an acid sulfite salt.

14. The process of claim 9, wherein the salt is a pyrosulfite salt.

15. The process of claim 9, wherein the salt is a thiosulfate salt.

16. The process of claim 9, wherein the salt is a normal sulfite salt.

References Cited in the file of this patent

UNITED STATES PATENTS

| | | |
|---|---|---|
| 2,542,216 | Somogyi | Feb. 20, 1951 |

FOREIGN PATENTS

| | | |
|---|---|---|
| 649,934 | France | Sept. 10, 1928 |
| 35,060 | France | June 18, 1929 |